(12) United States Patent
Gupta

(10) Patent No.: US 10,043,082 B2
(45) Date of Patent: Aug. 7, 2018

(54) IMAGE PROCESSING METHOD FOR DETECTING OBJECTS USING RELATIVE MOTION

(71) Applicant: MAGNA ELECTRONICS INC., Auburn Hills, MI (US)

(72) Inventor: Nikhil Gupta, Brampton (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/406,860

(22) Filed: Jan. 16, 2017

(65) Prior Publication Data

US 2017/0124405 A1 May 4, 2017

Related U.S. Application Data

(63) Continuation of application No. 14/113,415, filed as application No. PCT/CA2012/000057 on Jan. 20, 2012, now Pat. No. 9,547,795.

(Continued)

(51) Int. Cl.
*G06K 9/00* (2006.01)
*H04N 7/18* (2006.01)
(Continued)

(52) U.S. Cl.
CPC ............ *G06K 9/00805* (2013.01); *B60R 1/00* (2013.01); *G06K 9/00201* (2013.01);
(Continued)

(58) Field of Classification Search
None
See application file for complete search history.

(56) References Cited

U.S. PATENT DOCUMENTS 4,720,790 A 1/1988 Miki et al.
4,987,357 A 1/1991 Masaki
(Continued)

FOREIGN PATENT DOCUMENTS

JP 2007129560 5/2007
JP 2010020476 1/2010
(Continued)

OTHER PUBLICATIONS

Broggi et al., "Multi-Resolution Vehicle Detection using Artificial Vision," IEEE Intelligent Vehicles Symposium of Jun. 14-17, 2004.
(Continued)

*Primary Examiner* — Vu Le
*Assistant Examiner* — Tracy Mangialaschi
(74) *Attorney, Agent, or Firm* — Honigman Miller Schwartz and Cohn, LLP

(57) ABSTRACT

An obstacle detection method includes acquiring a series of image frames captured by a vehicle camera while the vehicle is in motion. First and second feature points are selected from a first detected object and are spaced apart in a first image frame and tracked over at least a second image frame, and movement of those feature points is determined. Third and fourth feature points are selected from a second detected object and are spaced apart in a first image frame and tracked over at least a second image frame, and movement of the third and fourth feature points is determined. The movements of the first and second feature points are compared to the movements of the third and fourth feature points to distinguish the first detected object as a three dimensional object and the second detected object as a two dimensional object.

23 Claims, 15 Drawing Sheets

Related U.S. Application Data

(60) Provisional application No. 61/478,717, filed on Apr. 25, 2011.

(51) Int. Cl.
| | |
|---|---|
| *G06T 7/13* | (2017.01) |
| *G06K 9/46* | (2006.01) |
| *G06T 7/73* | (2017.01) |
| *G06T 7/246* | (2017.01) |
| *G06K 9/62* | (2006.01) |
| *G06T 5/00* | (2006.01) |
| *G06T 7/80* | (2017.01) |
| *B60R 1/00* | (2006.01) |

(52) U.S. Cl.
CPC ....... *G06K 9/00798* (2013.01); *G06K 9/4604* (2013.01); *G06K 9/6202* (2013.01); *G06K 9/6215* (2013.01); *G06T 5/006* (2013.01); *G06T 7/13* (2017.01); *G06T 7/248* (2017.01); *G06T 7/74* (2017.01); *G06T 7/80* (2017.01); *H04N 7/183* (2013.01); *B60R 2300/8093* (2013.01); *G06T 2207/30241* (2013.01); *G06T 2207/30256* (2013.01); *G06T 2207/30261* (2013.01)

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |

(56) References Cited

U.S. PATENT DOCUMENTS

| | | | |
|---|---|---|---|
| 5,848,802 | A | 12/1998 | Breed et al. |
| 5,850,176 | A | 12/1998 | Kinoshita et al. |
| 5,850,254 | A | 12/1998 | Takano et al. |
| 5,867,591 | A | 2/1999 | Onda |
| 5,877,707 | A | 3/1999 | Kowalick |
| 5,877,897 | A | 3/1999 | Schofield et al. |
| 5,878,357 | A | 3/1999 | Sivashankar et al. |
| 5,878,370 | A | 3/1999 | Olson |
| 5,883,739 | A | 3/1999 | Ashihara et al. |
| 5,884,212 | A | 3/1999 | Lion |
| 5,890,021 | A | 3/1999 | Onoda |
| 5,896,085 | A | 4/1999 | Mori et al. |
| 5,899,956 | A | 5/1999 | Chan |
| 5,915,800 | A | 6/1999 | Hiwatashi et al. |
| 5,923,027 | A | 7/1999 | Stam et al. |
| 5,924,212 | A | 7/1999 | Domanski |
| 5,959,555 | A | 9/1999 | Furuta |
| 5,963,247 | A | 10/1999 | Banitt |
| 5,986,796 | A | 11/1999 | Miles |
| 5,990,469 | A | 11/1999 | Bechtel et al. |
| 5,990,649 | A | 11/1999 | Naga et al. |
| 6,020,704 | A | 2/2000 | Buschur |
| 6,049,171 | A | 4/2000 | Stam et al. |
| 6,052,124 | A | 4/2000 | Stein et al. |
| 6,066,933 | A | 5/2000 | Ponziana |
| 6,084,519 | A | 7/2000 | Coulling et al. |
| 6,097,024 | A | 8/2000 | Stam et al. |
| 6,100,799 | A | 8/2000 | Fenk |
| 6,144,022 | A | 11/2000 | Tenenbaum et al. |
| 6,175,300 | B1 | 1/2001 | Kendrick |
| 6,178,034 | B1 | 1/2001 | Allemand et al. |
| 6,201,642 | B1 | 3/2001 | Bos et al. |
| 6,223,114 | B1 | 4/2001 | Boros et al. |
| 6,227,689 | B1 | 5/2001 | Miller |
| 6,250,148 | B1 | 6/2001 | Lynam |
| 6,266,082 | B1 | 7/2001 | Yonezawa et al. |
| 6,266,442 | B1 | 7/2001 | Laumeyer et al. |
| 6,285,393 | B1 | 9/2001 | Shimoura et al. |
| 6,294,989 | B1 | 9/2001 | Schofield et al. |
| 6,297,781 | B1 | 10/2001 | Turnbull et al. |
| 6,310,611 | B1 | 10/2001 | Caldwell |
| 6,313,454 | B1 | 11/2001 | Bos et al. |
| 6,317,057 | B1 | 11/2001 | Lee |
| 6,320,282 | B1 | 11/2001 | Caldwell |
| 6,333,759 | B1 | 12/2001 | Mazzilli |
| 6,341,523 | B2 | 1/2002 | Lynam |
| 6,353,392 | B1 | 3/2002 | Schofield et al. |
| 6,370,329 | B1 | 4/2002 | Teuchert |
| 6,392,315 | B1 | 5/2002 | Jones et al. |
| 6,396,397 | B1 | 5/2002 | Bos et al. |
| 6,411,204 | B1 | 6/2002 | Bloomfield et al. |
| 6,420,975 | B1 | 7/2002 | DeLine et al. |
| 6,424,273 | B1 | 7/2002 | Gutta et al. |
| 6,430,303 | B1 | 8/2002 | Naoi et al. |
| 6,442,465 | B2 | 8/2002 | Breed et al. |
| 6,477,464 | B2 | 11/2002 | McCarthy et al. |
| 6,497,503 | B1 | 12/2002 | Dassanayake et al. |
| 6,498,620 | B2 | 12/2002 | Schofield et al. |
| 6,516,664 | B2 | 2/2003 | Lynam |
| 6,534,884 | B2 | 3/2003 | Marcus et al. |
| 6,539,306 | B2 | 3/2003 | Turnbull |
| 6,547,133 | B1 | 4/2003 | DeVries, Jr. et al. |
| 6,553,130 | B1 | 4/2003 | Lemelson et al. |
| 6,574,033 | B1 | 6/2003 | Chui et al. |
| 6,589,625 | B1 | 7/2003 | Kothari et al. |
| 6,594,583 | B2 | 7/2003 | Ogura et al. |
| 6,611,610 | B1 | 8/2003 | Stam et al. |
| 6,636,258 | B2 | 10/2003 | Strumolo |
| 6,650,455 | B2 | 11/2003 | Miles |
| 6,672,731 | B2 | 1/2004 | Schnell et al. |
| 6,674,562 | B1 | 1/2004 | Miles |
| 6,678,614 | B2 | 1/2004 | McCarthy et al. |
| 6,680,792 | B2 | 1/2004 | Miles |
| 6,690,268 | B2 | 2/2004 | Schofield et al. |
| 6,700,605 | B1 | 3/2004 | Toyoda et al. |
| 6,704,621 | B1 | 3/2004 | Stein et al. |
| 6,710,908 | B2 | 3/2004 | Miles et al. |
| 6,711,474 | B1 | 3/2004 | Treyz et al. |
| 6,714,331 | B2 | 3/2004 | Lewis et al. |
| 6,717,610 | B1 | 4/2004 | Bos et al. |
| 6,735,506 | B2 | 5/2004 | Breed et al. |
| 6,741,377 | B2 | 5/2004 | Miles |
| 6,744,353 | B2 | 6/2004 | Sjönell |
| 6,757,109 | B2 | 6/2004 | Bos |
| 6,762,867 | B2 | 7/2004 | Lippert et al. |
| 6,794,119 | B2 | 9/2004 | Miles |
| 6,795,221 | B1 | 9/2004 | Urey |
| 6,806,452 | B2 | 10/2004 | Bos et al. |
| 6,819,231 | B2 | 11/2004 | Berberich et al. |
| 6,823,241 | B2 | 11/2004 | Shirato et al. |
| 6,824,281 | B2 | 11/2004 | Schofield et al. |
| 6,850,156 | B2 | 2/2005 | Bloomfield et al. |
| 6,882,287 | B2 | 4/2005 | Schofield |
| 6,889,161 | B2 | 5/2005 | Winner et al. |
| 6,909,753 | B2 | 6/2005 | Meehan et al. |
| 6,946,978 | B2 | 9/2005 | Schofield |
| 6,968,736 | B2 | 11/2005 | Lynam |
| 6,975,775 | B2 | 12/2005 | Rykowski et al. |
| 6,989,736 | B2 | 1/2006 | Berberich et al. |
| 7,004,606 | B2 | 2/2006 | Schofield |
| 7,005,974 | B2 | 2/2006 | McMahon et al. |
| 7,038,577 | B2 | 5/2006 | Pawlicki et al. |
| 7,062,300 | B1 | 6/2006 | Kim |
| 7,065,432 | B2 | 6/2006 | Moisel et al. |
| 7,079,017 | B2 | 7/2006 | Lang et al. |
| 7,085,637 | B2 | 8/2006 | Breed et al. |
| 7,092,548 | B2 | 8/2006 | Laumeyer et al. |
| 7,111,968 | B2 | 9/2006 | Bauer et al. |
| 7,113,867 | B1 | 9/2006 | Stein et al. |
| 7,116,246 | B2 | 10/2006 | Winter et al. |
| 7,123,168 | B2 | 10/2006 | Schofield |
| 7,136,753 | B2 | 11/2006 | Samukawa et al. |
| 7,145,519 | B2 | 12/2006 | Takahashi et al. |
| 7,149,613 | B2 | 12/2006 | Stam et al. |
| 7,151,996 | B2 | 12/2006 | Stein et al. |
| 7,161,616 | B1 | 1/2007 | Okamoto et al. |
| 7,195,381 | B2 | 3/2007 | Lynam et al. |
| 7,202,776 | B2 | 4/2007 | Breed |
| 7,227,611 | B2 | 6/2007 | Hull et al. |
| 7,338,177 | B2 | 3/2008 | Lynam |
| 7,365,769 | B1 | 4/2008 | Mager |
| 7,370,983 | B2 | 5/2008 | De Wind et al. |
| 7,437,244 | B2 | 10/2008 | Okada |
| 7,460,951 | B2 | 12/2008 | Altan |
| 7,480,149 | B2 | 1/2009 | DeWard et al. |
| 7,490,007 | B2 | 2/2009 | Taylor et al. |
| 7,492,281 | B2 | 2/2009 | Lynam et al. |
| 7,502,048 | B2 | 3/2009 | Okamoto et al. |
| 7,526,103 | B2 | 4/2009 | Schofield et al. |
| 7,532,109 | B2 | 5/2009 | Takahama et al. |
| 7,566,851 | B2 | 7/2009 | Stein et al. |
| 7,581,859 | B2 | 9/2009 | Lynam |
| 7,592,928 | B2 | 9/2009 | Chinomi et al. |
| 7,639,149 | B2 | 12/2009 | Katoh |
| 7,681,960 | B2 | 3/2010 | Wanke et al. |
| 7,720,580 | B2 | 5/2010 | Higgins-Luthman |
| 7,724,962 | B2 | 5/2010 | Zhu et al. |
| 7,777,611 | B2 | 8/2010 | Desai |
| 7,786,898 | B2 | 8/2010 | Stein et al. |
| 7,855,755 | B2 | 12/2010 | Weller et al. |
| 7,881,496 | B2 | 2/2011 | Camilleri et al. |
| 7,914,187 | B2 | 3/2011 | Higgins-Luthman et al. |
| 7,949,486 | B2 | 5/2011 | Denny et al. |
| 7,952,490 | B2 | 5/2011 | Fechner et al. |
| 7,965,336 | B2 | 6/2011 | Bingle et al. |
| 8,013,780 | B2 | 9/2011 | Lynam et al. |
| 8,027,029 | B2 | 9/2011 | Lu et al. |
| 8,058,977 | B2 | 11/2011 | Lynam |
| 8,064,643 | B2 | 11/2011 | Stein et al. |
| 8,082,101 | B2 | 12/2011 | Stein et al. |
| 8,164,628 | B2 | 4/2012 | Stein et al. |
| 8,254,635 | B2 | 8/2012 | Stein et al. |
| 8,340,866 | B2 | 12/2012 | Hanzawa et al. |
| 8,378,851 | B2 | 2/2013 | Stein et al. |

(56) References Cited

U.S. PATENT DOCUMENTS

| | | |
|---|---|---|
| 8,452,055 B2 | 5/2013 | Stein et al. |
| 8,487,991 B2 | 7/2013 | Zhang et al. |
| 8,553,088 B2 | 10/2013 | Stein et al. |
| 8,849,495 B2 | 9/2014 | Chundrlik, Jr. et al. |
| 9,547,795 B2 | 1/2017 | Gupta |
| 2002/0015153 A1 | 2/2002 | Downs |
| 2002/0044065 A1 | 4/2002 | Quist et al. |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0032321 A1 | 2/2004 | McMahon et al. |
| 2004/0114381 A1 | 6/2004 | Salmeen et al. |
| 2005/0078389 A1 | 4/2005 | Kulas et al. |
| 2005/0134983 A1 | 6/2005 | Lynam |
| 2005/0165550 A1* | 7/2005 | Okada ............ G08G 1/166 701/301 |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0111841 A1* | 5/2006 | Tseng ............ B60R 1/00 701/301 |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0104476 A1 | 5/2007 | Yasutomi et al. |
| 2007/0274566 A1* | 11/2007 | Fujimoto ......... G06K 9/00805 382/103 |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0189783 A1* | 7/2009 | Koitabashi ......... G01S 11/12 340/937 |
| 2009/0243824 A1 | 10/2009 | Peterson et al. |
| 2009/0244361 A1 | 10/2009 | Gebauer et al. |
| 2009/0252377 A1* | 10/2009 | Akita ............ G06K 9/3241 382/106 |
| 2009/0265069 A1 | 10/2009 | Desbrunes |
| 2009/0279740 A1* | 11/2009 | Yamazaki ......... G01C 3/10 382/106 |
| 2009/0295181 A1 | 12/2009 | Lawlor et al. |
| 2010/0020170 A1 | 1/2010 | Higgins-Luthman et al. |
| 2010/0097469 A1 | 4/2010 | Blank et al. |
| 2010/0228437 A1 | 9/2010 | Hanzawa et al. |
| 2011/0115912 A1 | 5/2011 | Kuehnle et al. |
| 2011/0216201 A1 | 9/2011 | McAndrew et al. |
| 2012/0044066 A1 | 2/2012 | Mauderer et al. |
| 2012/0062743 A1 | 3/2012 | Lynam et al. |
| 2012/0218412 A1 | 8/2012 | Dellantoni et al. |
| 2012/0245817 A1 | 9/2012 | Cooprider et al. |
| 2012/0262340 A1 | 10/2012 | Hassan et al. |
| 2012/0303222 A1 | 11/2012 | Cooprider et al. |
| 2013/0124052 A1 | 5/2013 | Hahne |
| 2013/0129150 A1 | 5/2013 | Saito |
| 2013/0131918 A1 | 5/2013 | Hahne |
| 2014/0067206 A1 | 3/2014 | Pflug |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0350834 A1 | 11/2014 | Turk |
| 2014/0379233 A1 | 12/2014 | Chundrlik, Jr. et al. |

FOREIGN PATENT DOCUMENTS

| | | |
|---|---|---|
| JP | 2010038907 | 2/2010 |
| WO | WO2010119329 | 10/2010 |
| WO | WO2012145818 | 1/2012 |

OTHER PUBLICATIONS

Broggi et al., "Automatic Vehicle Guidance: The Experience of the ARGO Vehicle", World Scientific Publishing Co., 1999.
International Search Report dated Mar. 23, 2012 for corresponding PCT Application No. PCT/CA2012/00057.

\* cited by examiner

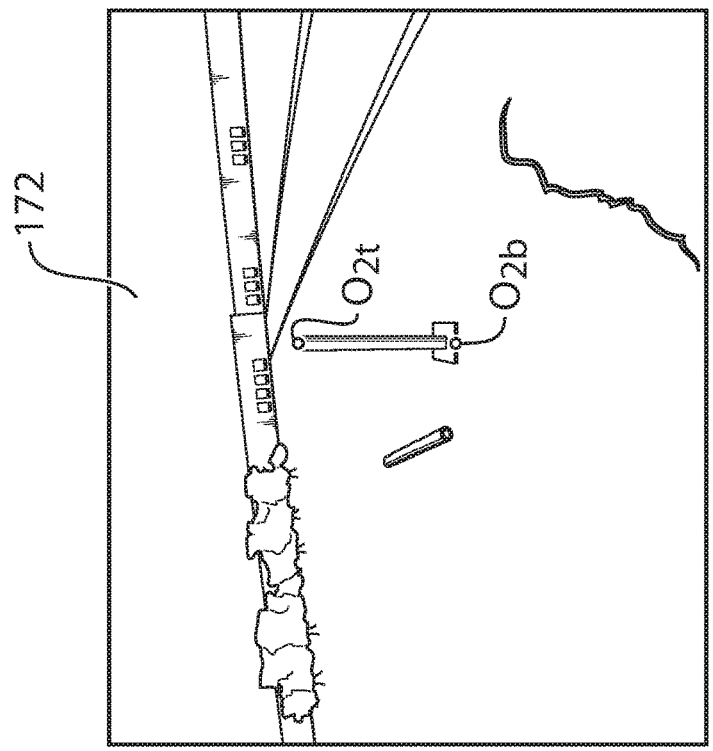
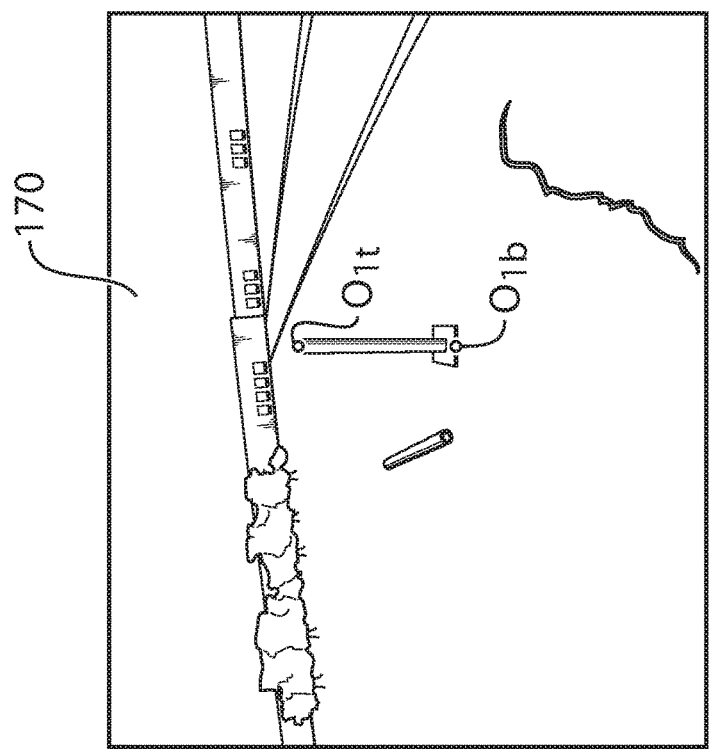

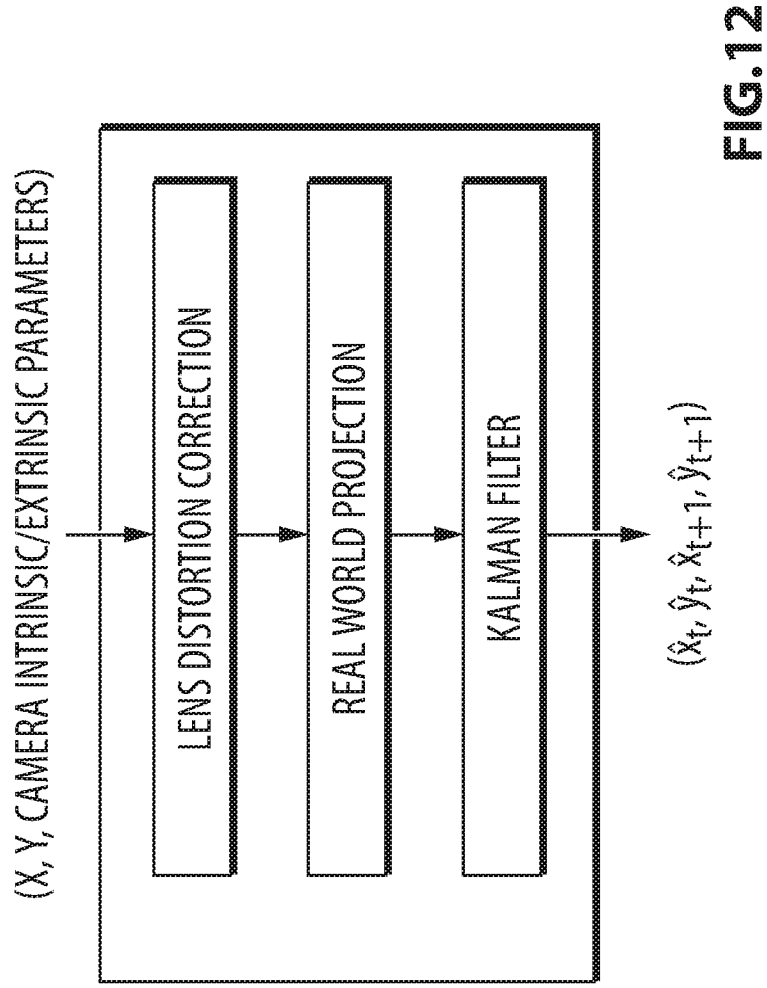

IMAGE PROCESSING METHOD FOR DETECTING OBJECTS USING RELATIVE MOTION

CROSS-REFERENCE TO RELATED APPLICATIONS

The present application is a continuation of U.S. patent application Ser. No. 14/113,415, filed Oct. 23, 2013, now U.S. Pat. No. 9,547,795, which is a 371 U.S. national phase application of PCT Application No. PCT/CA2012/000057, filed Jan. 20, 2012, which claims priority to U.S. Provisional Patent Application No. 61/478,717, filed Apr. 25, 2011.

FIELD OF INVENTION

The invention relates to the field of image processing, and more particularly to a method and system for discerning three-dimensional objects using relative motion between the camera and the objects, and an object detection system based on same.

BACKGROUND OF INVENTION

Many vehicles now incorporate one or more obstacle detection system which use cameras to provide a field of view of the roadway and surrounding environment. The obstacle detection systems process the video stream or sequence of image frames provided by the camera in an attempt to ascertain the existence of an obstacle in the path of vehicle. Obstacle detection algorithms do this by attempting identify a variety of objects localized in one or more predefined regions of interest in the captured field of view, determine whether or not such objects are real, and estimate their path relative to the vehicle to determine whether or not such objects will indeed become obstacles.

The conventional approach to solving such a problem is to develop a series of classifiers and detectors to detect a group of predefined objects. The classifiers work in a cascade or in a parallel fashion to detect image content such as pedestrians, vehicles and geometrically shaped objects such as balls and poles. Such systems may require significant computational resources provided by expensive signal processors. In addition, in such a system, all the objects that need to be detected have to be defined in the development stage and require extensive training for the classifiers. Such a process is expensive and time consuming and might not be generic enough with respect to all possible different objects that might be encountered in the real world.

SUMMARY OF INVENTION

In order to overcome some of the above mentioned shortcomings, the invention proposes a more generic approach which does not depend upon the design of specific classifiers. Instead, the invention uses the relative motion between the vehicle and the surrounding environment to identify whether or not detected objects are relevant. This approach uses a single image sensor and can be employed for detecting generic objects.

Generally speaking, the invention utilizes the principle that spaced apart physical points that in reality have a vertical dimension will move at different rates when projected to the image plane provided by the vehicular camera, whereas spaced apart physical points that in reality lie only horizontally along the ground plane will move at the same rate when projected to the image plane. Using this principle the invention is able to rapidly distinguish between three dimensional objects that could be relevant to the obstacle detection analysis and irrelevant two dimensional objects that, for example, may be pavement markings or artifacts such as shadows.

The foregoing principle will be better understood with reference to FIGS. 1 and 2. Referring to FIG. 1, the vehicular camera establishes an image plane 20. The camera has a focal point f through which all light rays pass. Axis 21 is a normal projection to the image plane 20. Axis 22 represents the real vertical plane, and axis 24 represents the ground plane (a horizontal plane corresponding to the roadway). An object lies in the camera field of view. The object has a first point seen by image pixel 26, corresponding to ray 28, and a second point, seen by image pixel 27, corresponding to ray 29. This object may be either a vertical object 30 or a horizontal object 40 (lying along the ground plane 22) because the vertical object 30 has a first point P1 lying along the ray 28 and the horizontal object 40 also has a first point G1 lying along the ray 28, and likewise the vertical object 30 has a second point P2 lying along the ray 29 and the horizontal object 40 also has a second point G2 lying along the ray 29. The camera sees only two vertically spaced points at pixels 26 and 27, so without further information it is not possible for the camera to discern if the rays 28, 29 impinging on pixel 26, 27 come from points lying on the ground or from a vertical object.

However, referring additionally to FIG. 2, if there is relative motion between the object and the image plane additional information can be garnered to be able to differentiate between a vertically oriented object and a horizontally oriented object. Consider again the horizontally oriented object 40 which lies on the ground plane. It has two opposing edge points that lie at initial positions G1, G2. (To the camera, these two points could also correspond to points P1 and H of vertical object 30.) If the horizontal object 40 moves relative to the camera by a real distance d, then the edge points will move to positions G1', G'. With the height and angular orientation of the camera known, it is possible to calculate the distance moved in the ground plane by the end points, i.e., the distance between G1 to G1' and between G2 to G2. As the object is presumed to be of constant length for at least a short period of time, the distance between G1 and G1' will be d and the distance between G2 to G2' will also be d.

Now consider the vertical object 30. It has two opposing edge points that lie at initial positions P1, P2. The point P1, lying along ray 28, projects onto the ground plane at point G1 as previously discussed. Point P2 in this example lies along the ground plane (but it need not). Let the vertical object 30 move relative to the camera by a real distance d. The top edge point moves from position P1 to position P1', and the bottom edge point moves from position P2 to P2'. Now calculate the distance moved in the ground plane by these end points. P1 projects onto the ground plane at point G1. Point P1' projects onto the ground plane at point X. So, a distance calculation in the ground plane between points P1 and P1' effectively yields a result computing the distance between G1 and X, resulting in a much larger distance d++. On the other hand, P2 and P2' are located on the ground plane so the distance between them will be computed as d. The change d++ in the ground plane between P1 and P1' differs considerably from the change d between P2 and P2', thus enabling a vertical object to be distinguished from an object lying substantially along the ground plane.

The principle holds for distinguishing between an object lying substantially along any selected real horizontal plane and an object lying generally transverse to the selected horizontal plane. Likewise, the principle applies even when the vertical object does not touch the selected real horizontal plane because vertically spaced apart points will move at different rates when projected onto the selected horizontal plane.

In the preferred obstacle detection system described in greater detail below, a vehicular camera is utilized to capture a video stream or sequence of image frames. The image frames are processed by an image processor which executes an obstacle detection algorithm. The preferred system then processes the images to extract edges therein. (An example of a road image 10 and its edge image 12 can be seen in FIGS. 3 and 4 respectively.)

The preferred system processes the edge images to identify potential objects preferably within a region of interest (ROI) in the image frame. Objects (obstacles or not) are identified by their boundaries or contours. If an object moves across successive image frames, the edges of such an object will also move and so edge based features are used to identify the location of the objects and are also used to track the objects across frames. However, owing to environmental effects and low contrast, it is possible that the edges of an object are not always isolated from other objects or the general background. In order to make the object localization more reliable, the preferred system examines different features such as color and texture cues, in conjunction with the edges, in order to detect and isolate objects from one another.

The isolated objects could be actual three dimensional objects or they could be two dimensional objects on the ground such as shadows or pavement markings. Using a single monocular image sensor, it can be quite difficult to differentiate one type of object from another. However, if there is relative motion between these objects and the camera, then using the principles outlined above the preferred system can estimate which of the detected objects are above a certain specified height threshold and which detected objects are not (such as markings on the ground). Accordingly, the preferred system examines the motion of at least two different feature points in the edge image of each object across image frames. If there is relative motion between the camera and the object, for the same physical distances traveled, points lying at different physical heights will have different rates of change in the image plane (termed "differential-gradient effect"). Thus, if the selected feature points in the edge image of an isolated object do not have different rates of change, within a tolerance, the preferred system deems that object to be an irrelevant two dimensional object. Similarly, if the selected feature points in the edge image of an isolated object do have different rates of change, within a tolerance, the preferred system deems that object to be relevant and estimates the relative path of that object to determine whether or not it will become an obstacle to the vehicle.

Thus, one aspect of the invention provides a method of obstacle detection. In this method, a vehicle is provisioned with a camera having an external field of view and a set of image frames provided by the camera are acquired whilst the vehicle is in motion. The image frames define an image plane having a vertical aspect and a horizontal aspect. The relevancy of an object is determined by (i) selecting first and second feature points from the object that are spaced apart vertically in a first image frame; (ii) tracking the positions of the first and second feature points over at least a second image frame; and (iii) deciding the object to be relevant if the first and second feature points move dissimilar distances in physical space, within a tolerance, and deciding the object to be irrelevant otherwise. The motion of relevant objects is then estimated to determine if any relevant object is likely to become an obstacle to the vehicle.

In practice, an edge detection is preferably carried out on the set of images frames and one or more objects are isolated based on their edge contours. The most desirable feature points for tracking across frames are the topmost and bottommost pixel points of any given isolated object as these can be used to estimate the relative physical displacement of the object. For this estimated displacement of the object, by comparing the estimated pixel movement of the topmost detected point of the object with the actual pixel movement of the same point, the object can be determined to be a relevant object.

In addition, in practice, a given pixel is preferably position is de-warped to account for lens distortion prior to determining a physical location corresponding to the given pixel position.

BRIEF DESCRIPTION OF THE DRAWINGS

The foregoing and other aspects of the invention will be better understood with respect to the attached drawings, wherein:

FIGS. 10A and 10B are successive image frames provided by a vehicular camera which has moved relative to an object seen by the camera;

FIG. 12 is a flowchart of a software module employed by the object detection algorithm.

DETAILED DESCRIPTION OF PREFERRED EMBODIMENTS

For reference purposes, the following mathematical nomenclature is used in this description. A vector or a matrix is represented in bold face, while a scalar entity is represented in a regular face. The lower case is used to denote the dimensions and pixel locations in two dimensional image space. Thus, the collection of all the pixels in an image can be denoted as f and a pixel at column x and row y in the image f can be represented as f (x, y). The coordinates of a point in the three-dimensional world are represented using the upper case. A point on the ground can be represented in its vector form as X, or also as $[X_w, Y_w, Z_w]$.

Figure 3:
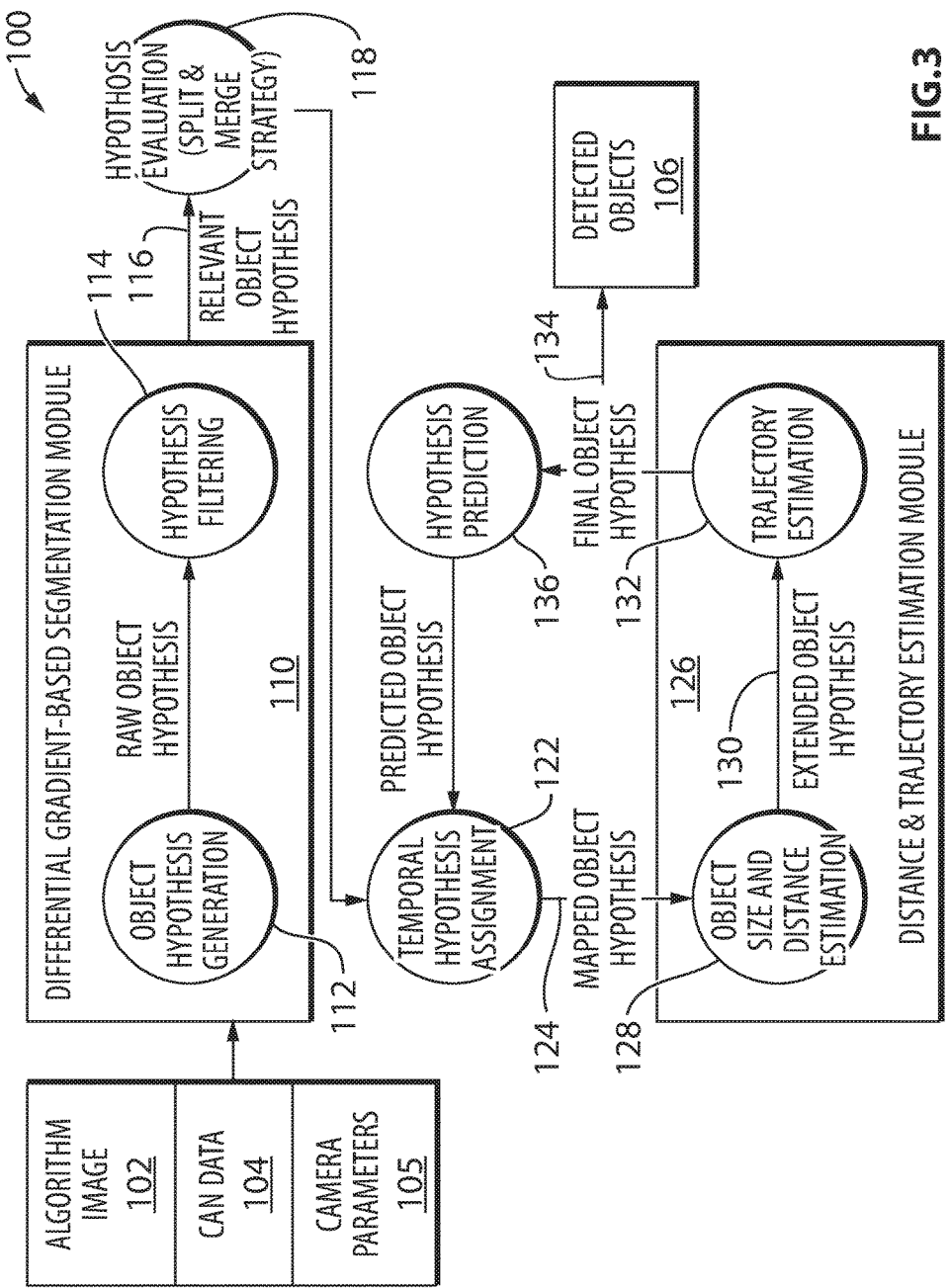
FIG. 3 is a system block diagram of an object detection algorithm according to a preferred embodiment.

FIG. 3 shows a system block diagram of a preferred obstacle detection system 100. The inputs to system 100 include the image frames 102 from the vehicular camera (not explicitly shown) and vehicle CAN (controller area network) data 104 such as the instantaneous speed of the vehicle and its steering angle. In an overall system, knowledge of the vehicle speed allows for the optimization of the tracking of feature points and assessing the priority of the detected obstacles and the steering angle can be used for estimating and predicting the relative trajectory of the detected obstacles. In addition, the system 100 also has or receives information 105 about the camera. This includes intrinsic camera parameters such as its principal or central point, focal length, and lens map and extrinsic parameters such as the position of the camera. The lens map refers to the characteristic description of the particular lens being used in the system which describes the behavior of the lens and allows for the generation of the output angle of the light given any input incidence angle. In the preferred embodiment the system 100 is operated in conjunction with a dynamic calibration system that is capable of dynamically ascertaining the translation position and rotational angles of the camera in the field so that any deviations in the position of the camera from a nominal position/angle over time are accounted for. The preferred calibration system is described in Applicant's PCT Application No. PCT/CA2012/000056, titled "Method and System for Dynamically Calibrating Vehicular Cameras" and filed contemporaneously herewith, and published Nov. 1, 2012 as International Publication No. WO 2012/145818, the contents of which are incorporated by reference herein in their entirety.

The system 100 outputs one or more detected objects 106 (if any). The detected objects 106 are output as an array of data structures indicating: object centroid; object bounding box (position and breadth); and an estimated distance from the vehicle.

A differential, gradient-based, segmentation module 110 receives the input information 102-105. At an initial stage 112 the module 110 uses the input image frames to hypothesize or postulate the existence of an object by detecting and isolating objects from the background, within a predefined region of interest (ROI). At a subsequent stage 114 the module 110 filters the postulated objects to discern those which have dimensions above a defined height threshold. This is an important practical consideration because most real life objects that pose any threat to the vehicle (or to a pedestrian) have a significant vertical component. This module thus generates initial object hypotheses at output 116 which can be further refined and processed for final output.

The segmentation module 110 is based on a differential gradient based pseudo-stereo effect, which has the following features:
  Points lying on the same vertical axis at different planar heights (in reality) move at different pixel rates in the captured video. This allows for separation of hypothesized objects which lie on the ground plane (or other selected horizontal plane) versus those which are three dimensional in nature and pose a threat to the vehicle.
  Owing to the above principle, this approach allows the detection of even those objects which are stationary around the vehicle if the vehicle itself is moving. This allows for detection of stationary pedestrians or poles or other objects which the vehicle might be driving towards.
  Only relative motion is required between the objects and vehicle.

Figure 4:
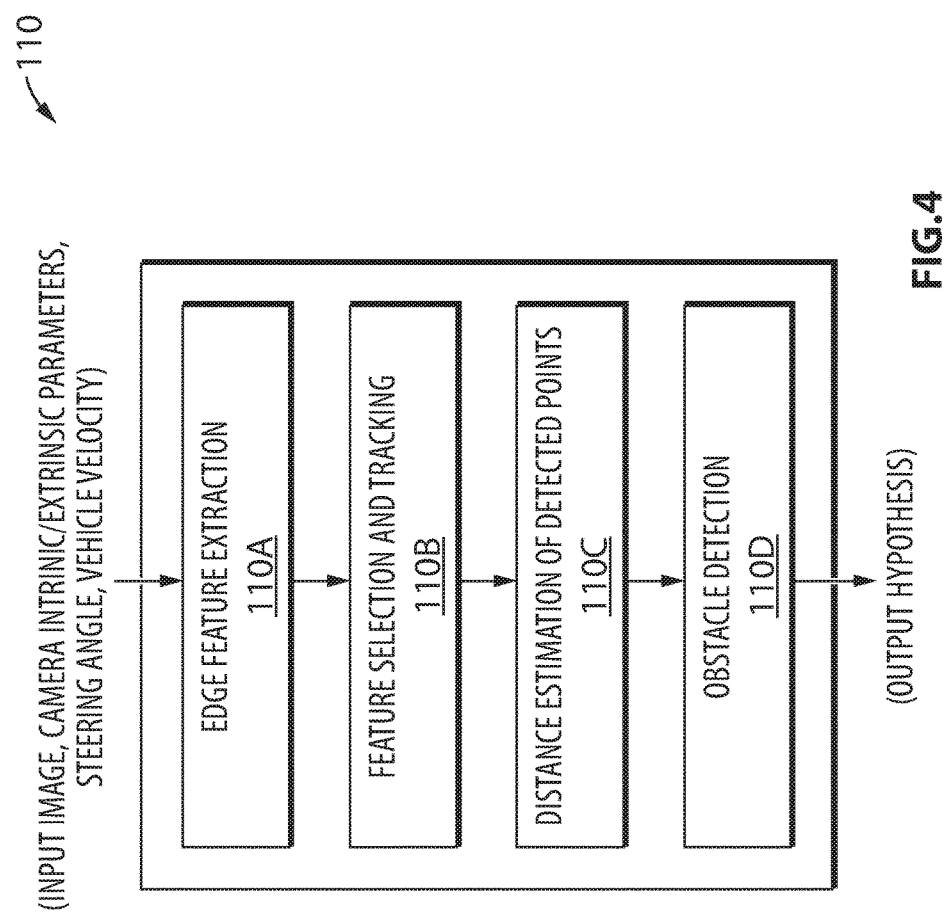
FIG. 4 is a flowchart of a software module employed by the object detection algorithm.

Referring additionally to FIG. 4, the segmentation module 110 includes the following functional blocks, discussed in turn below: edge feature extraction 110A; feature selection and tracking 110B; physical distance estimation of detected points 110C; and obstacle detection 110D.

The edge detection block 110A uses the contours of objects as a means to segment them from the background image. An object can be assumed to be bound by its contour or its edge, which can be extracted using the gradient operator.

Figure 5:
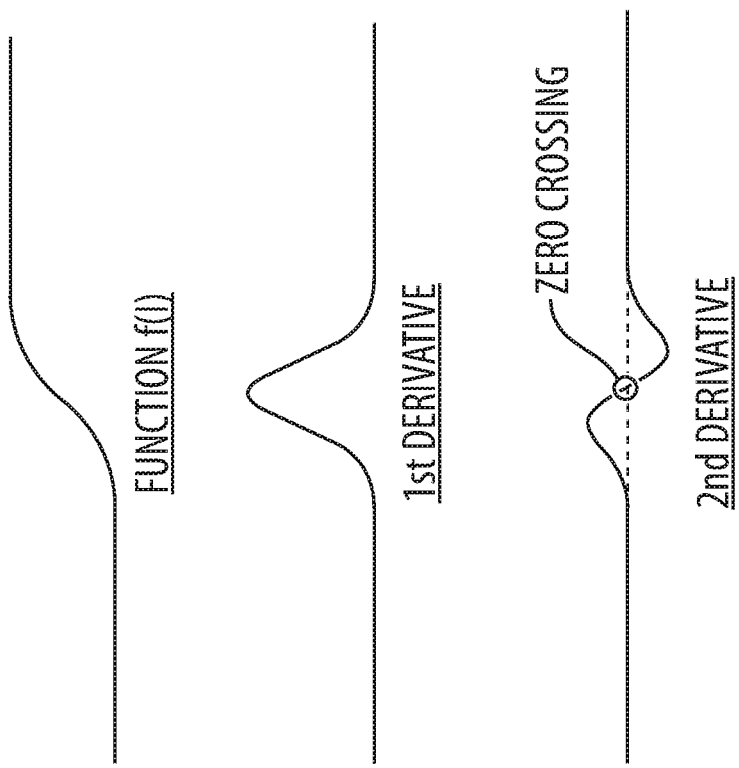
FIG. 5 is a graph illustrating derivatives of an exemplary single dimension function.

The edge points of an image can be detected by finding the zero crossings of the second derivative of the image intensity. The idea is illustrated for a one dimensional signal f(I) in FIG. 5. However, calculating the $2^{nd}$ derivative is very sensitive to noise. This noise should be filtered out before edge detection. To achieve this, edge detection block 110A uses the "Laplacian of Gaussian (LoG)" method as known in the art per se. This method combines Gaussian filtering with the Laplacian for edge detection.

There are three main steps in Laplacian of Gaussian edge detection: filtering, enhancement, and detection.

Gaussian filtering is used for smoothing and the second derivative of which is used for the enhancement step. The detection criterion is the presence of a zero crossing in the second derivative with a corresponding large peak in the first derivative.

In this approach, noise is first reduced by convoluting the image with a Gaussian filter which removes isolated noise points and small structures. Those pixels, that have locally maximum gradient in the zero crossing of the second derivative, are considered as edges by the edge detector. To avoid detection of insignificant edges, only the zero crossings whose corresponding first derivative is above some threshold, are selected as edge point. The edge direction is obtained using the direction in which zero crossing occurs.

Figure 6:
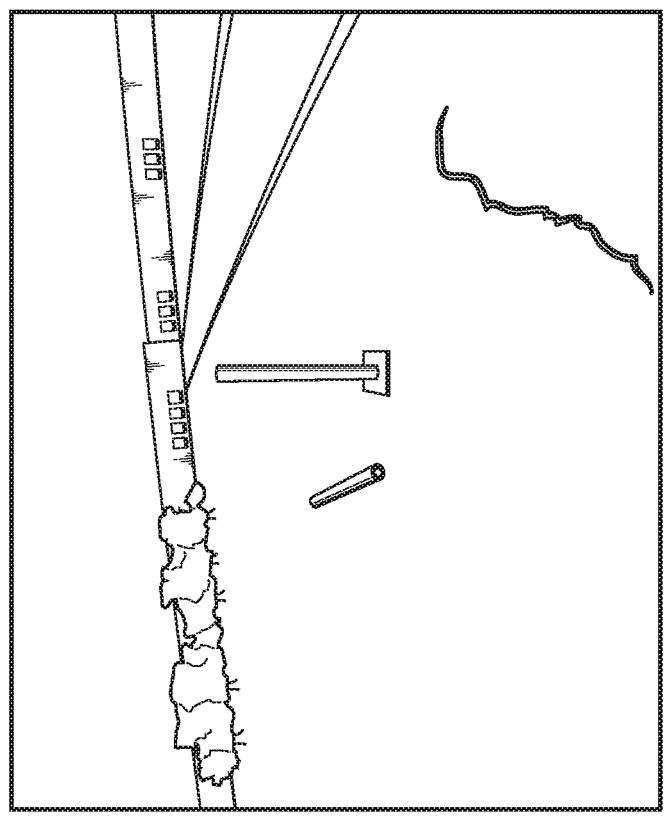
FIG. 6 is an image frame provided vehicular camera which sees a vertical object and a horizontal object.
Figure 7:
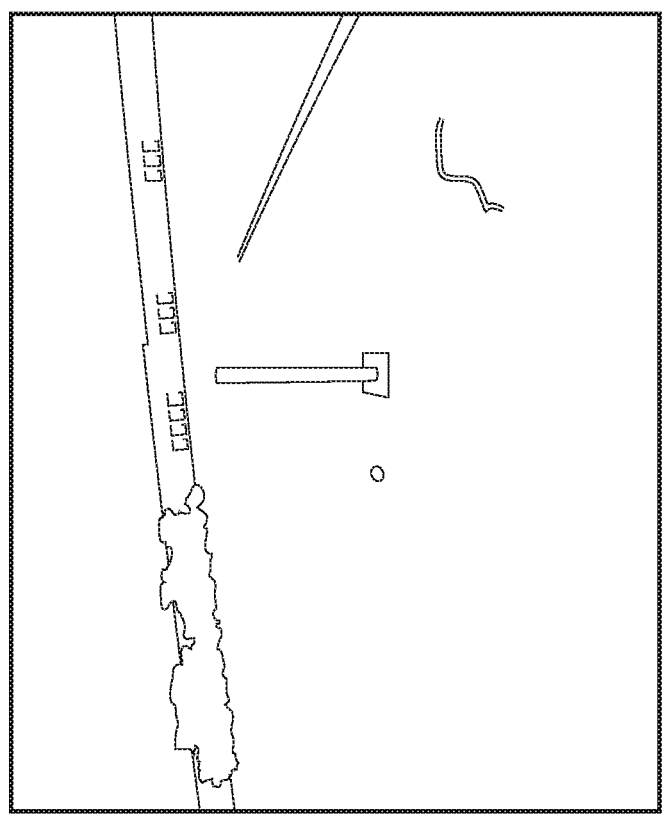
FIG. 7 is an edge image of FIG. 6.

The output of the LoG operator; h(x,y); is obtained by the convolution operation:

$$h(x, y) = \Delta^2[g(x, y) * f(x, y)]$$
$$= [\Delta^2 g(x, y)] * f(x, y)$$

where $$\Delta^2 g(x, y) = \left(\frac{x^2 + y^2 - 2\sigma^2}{\sigma^4}\right) e^{-(x^2+y^2)/2\sigma^2}$$

where, $\Delta$ and $*$ are the gradient and convolution operators, respectively. $\sigma$ is the standard deviation of the smoothing function g( ), x and y are the location column and the row index, respectively, and f(x,y) represents the pixel at column x and row y in the input image FIG. 7 shows an example of an edge image 140 obtained by using the LoG operator on an input image 138 shown in FIG. 6.

Figure 8:
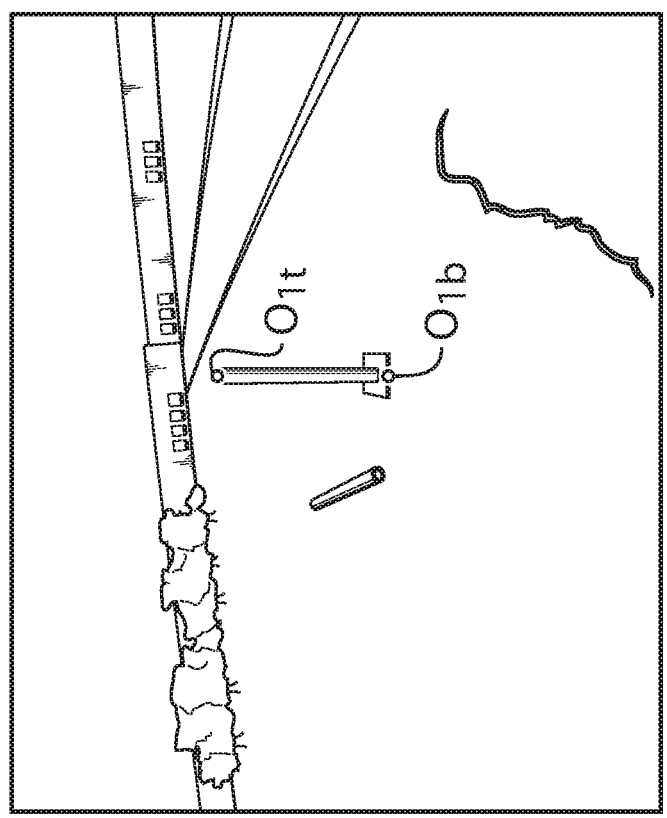
FIG. 8 is composite image showing the image of FIG. 6 with associated edge detection contours.

Once the objects have been isolated using their contours, each object or group of objects can be identified by its edge. The feature selection and tracking block 110B assumes that the bottom of the each objects lies on the ground while the top of the object is either on the ground or not, depending if the object is flat or has a three-dimensional shape. Most preferably the top and bottom of each contour are selected as the points of interest in the image frame which need to be investigated to determine if the object is above a certain threshold of height or not. These topmost and bottommost points of each edge contour are then tracked from the current frame to the next frame to find their corresponding location in the next frame. For example, FIG. 8 shows the top and bottom feature points of interest $O_{1t}$ and $O_{1b}$ which are tracked across frames. (Note that the feature points $O_{1t}$ or $O_{1b}$ may each comprise multiple pixels.)

In addition, for more robustness, instead of just selecting the topmost and bottommost points, the feature selection and tracking block 110B preferably also selects and processes a set of additional feature points along the contour.

Once the feature points that define the top and bottom of each object are isolated, they, as well as any other selected feature points, can be tracked across frames using a block matching algorithm. (Note that there is no need to track the entire image or object contour, only the selected feature points need to be tracked across frames.)

Figure 9A:
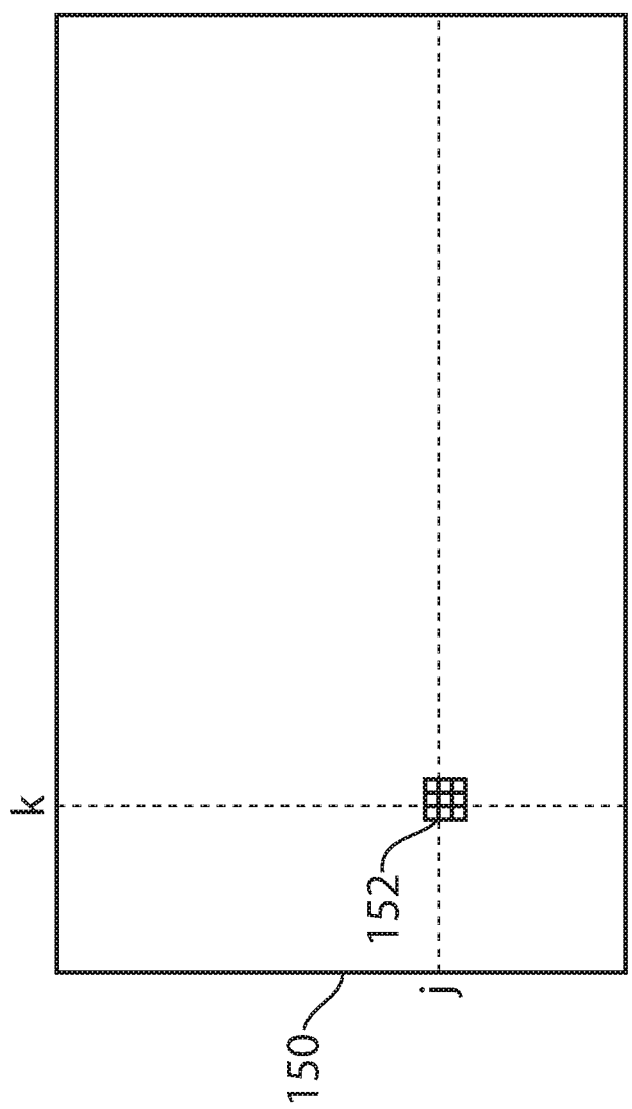
FIGS. 9A and 9B are schematic diagrams illustrating the function of a block detection algorithm.
Figure 9B:
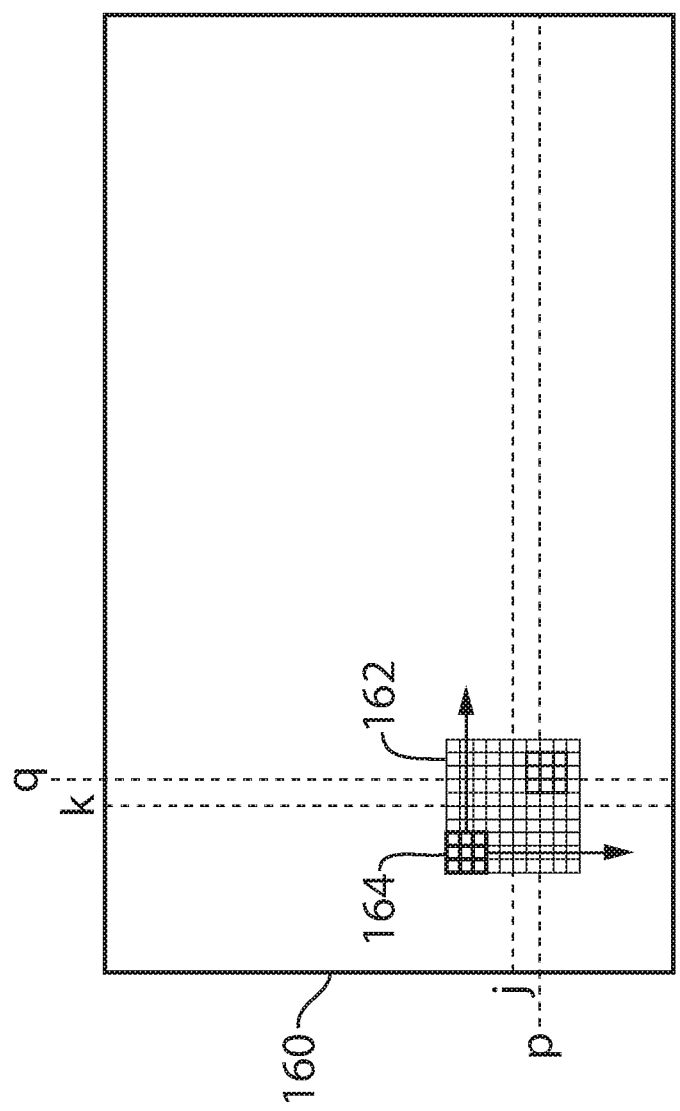

Any given feature point will likely subsist for least a few following image frames and with the typical frame rate of 30 fps the given feature point will move relatively slowly across image frames. The block matching algorithm establishes a macro block around the feature point and looks for a best match. For example, FIG. 9A shows as an example a feature point 152 selected by the feature selection and tracking block 110B that consists of a 3×3 pixel array in image frame 150. The pixel array 152 has a middle position at pixel position j,k. In the following or otherwise subsequent image frame 160 shown in FIG. 9B, the feature selection and tracking block 110B establishes a macro-block 162 centered on the position of the selected feature point 152. The size of the macro-block 162 is based on the estimated degree of movement of the feature point/area to be tracked, and in this example encompasses a 10×10 array centered at pixel position j,k. A search window 164 is defined. The feature selection and tracking block 110B slides the search window 164 in a raster fashion one pixel at a time to find a contiguous array of pixels in the macro-block 162 whose values are the closest match to the values of the selected feature point 152. The closest match is preferably defined based on a minimum absolute error criterion. To make the search process optimal, a hierarchical search may be performed if the search window 164 is larger than a default size. In this manner, the position of the selected feature point 152 may be tracked to a new location, for example to pixel position p,q as indicated in FIG. 9.

The distance estimation block 110C calculates the physical distances to the selected feature points in the ground plane.

A point in the image, $x_i$, can be defined as $$x_i = [x_p, y_p, 1]^T$$

Figure 1:
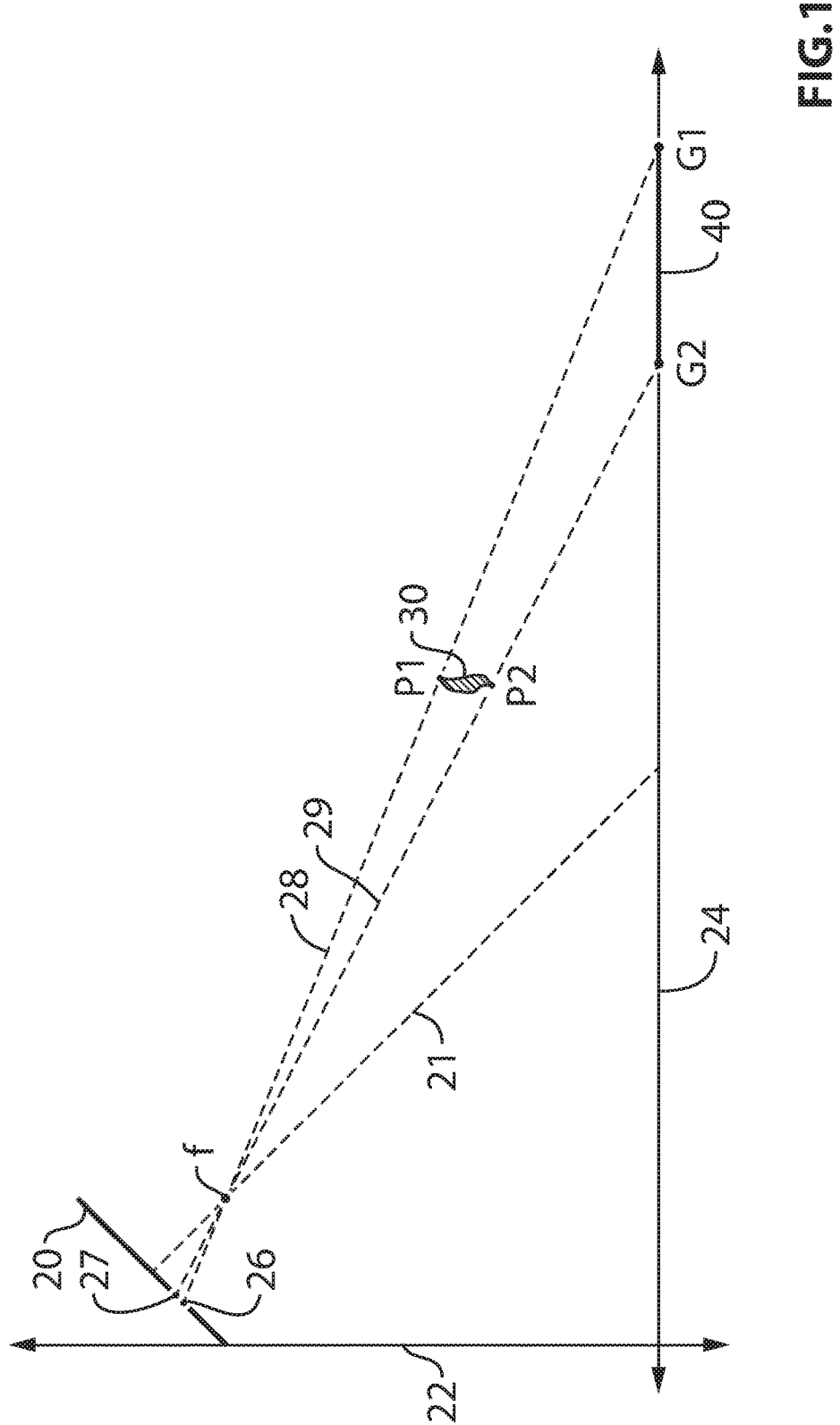
FIG. 1 is a schematic diagram illustrating how vertical and horizontal objects in the real world are viewed by a vehicular camera.
Figure 2:
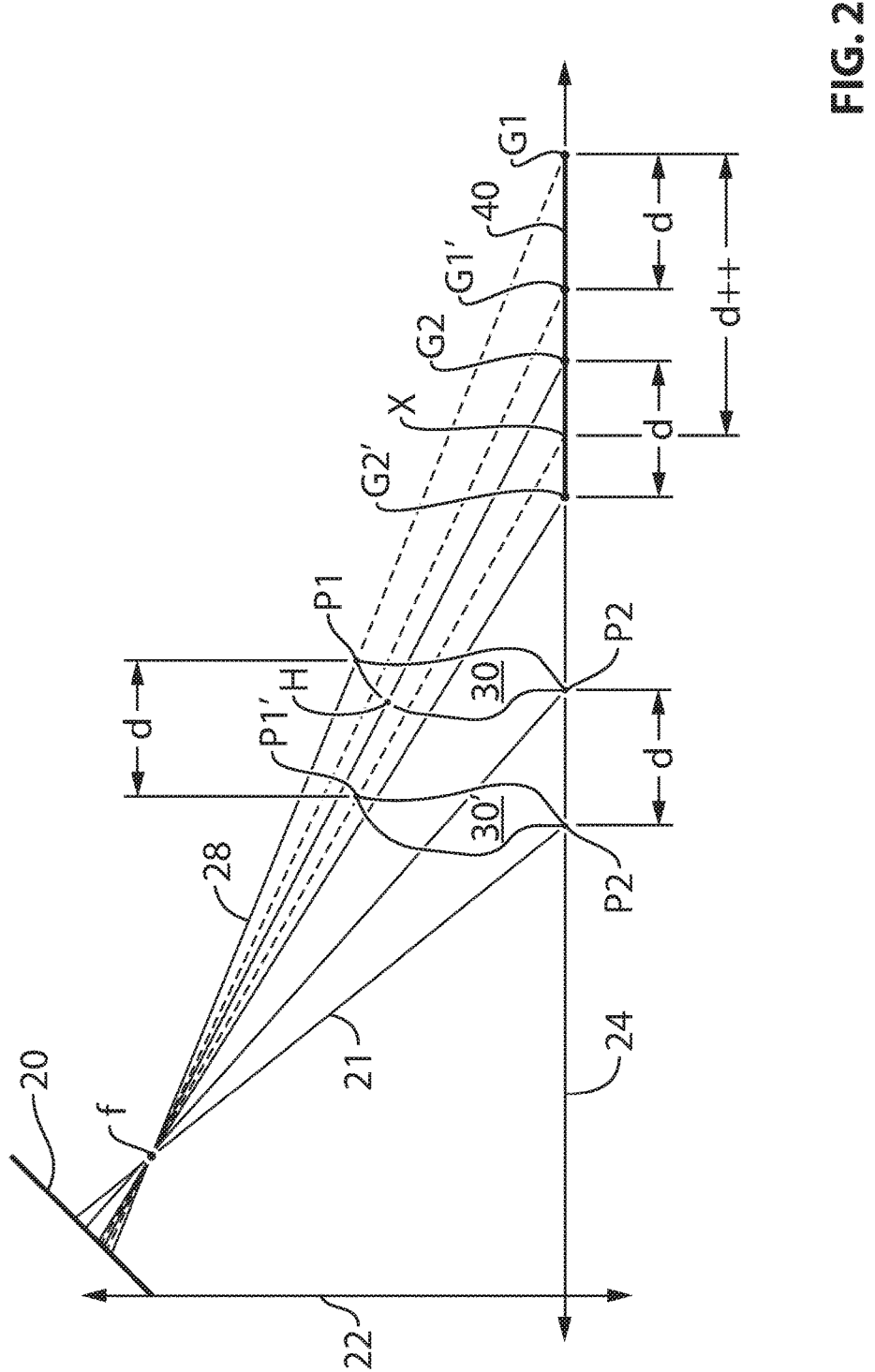
FIG. 2 is a schematic diagram illustrating how the movement of vertical and horizontal objects in the real world are viewed differently by a vehicular camera.

It is desired to compute the real world coordinates of this point on the ground plane, given the camera position and geometry. Before estimating the distance, a selected pixel location is de-warped using the distortion function of the lens, which is one of the intrinsic parameters provided in input 105. In a de-warped image, every image point can be expressed as a 3D Plucker line matrix, which correlates to one of the rays running through the camera focal point and impinging upon the image plane (see FIG. 1). As the projected real world is assumed to be flat or planar, the intersection point of the Plucker line matrix and the ground plane is needed. The Homography matrix, H (a 3×4 matrix), describes the projection from the image point to the world coordinate inside the plane and so the intersection point with the plane, which is defined as $$X_i = H \cdot x_i$$

where $X_i = [X_1 Y_1 Z_1 N_1]^T$

The real world coordinates of the image point on the ground plane can be estimated with respect to the origin using $X_i$ as: $[X_w = X_1/N_1; Y_w = Y_1/N_1; Z_w = Z_1/N_1]$. To compute the real world distance of the various points using the above equation, the intrinsic and the extrinsic parameters of the camera being used are necessary. Given these parameters, the Homography matrix, H, can be estimated as the inverse of the projection matrix, P, which is defined as:

$$P = KRT$$

where $$K = \begin{bmatrix} -\frac{f}{p} & 0 & axisX \\ 0 & \frac{f}{p} & axisY \\ 0 & 0 & 1 \end{bmatrix}$$

$$R = \begin{bmatrix} \cos\gamma & \sin\gamma & 0 \\ -\sin\gamma & \cos\gamma & 0 \\ 0 & 0 & 1 \end{bmatrix} \times$$

$$\begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix} \text{ and } T = \begin{bmatrix} 1 & 0 & 0 & -t_1 \\ 0 & 1 & 0 & -t_2 \\ 0 & 0 & 1 & -t_3 \end{bmatrix}$$

In the above equations, f and p are the focal length of the lens and the pixel size of the sensor, respectively. axisX and axisY are the column and row coordinates of the optical center on the image plane. α, β, and γ represent the angles of rotation around X, Y, and Z axes, respectively, and $t_1$, $t_2$, and $t_3$ are the translations along X, Y, and Z axes, respectively.

The object detection block 110D filters the segmented objects based on the estimated real height of the objects. Those objects that are estimated to have a real height greater than a selected threshold are considered to be relevant objects worth tracking, whereas those objects that are estimated to have a real height less than a selected threshold are considered to be irrelevant objects not worth tracking.

For height threshold verification, the object detection block 110D assumes that there is some relative motion between the object and the camera, i.e., either the camera moves or the object itself moves with respect to the camera. For example, FIGS. 10A and 10B illustrate two images frames 170, 172 in which the camera has moved and thus shows the relative displacement of the object in the image. Since the objects are solid connected entities, it is fair to assume that the real-world distance traversed by the bottommost point on the object, $O_{1b}$ (FIG. 10A) would be the same as that of the topmost point of the object, $O_{1t}$. The object detection block 110D use this as the basis for detecting if the topmost point of the object is above a certain height threshold, T, or not.

Figure 11A:
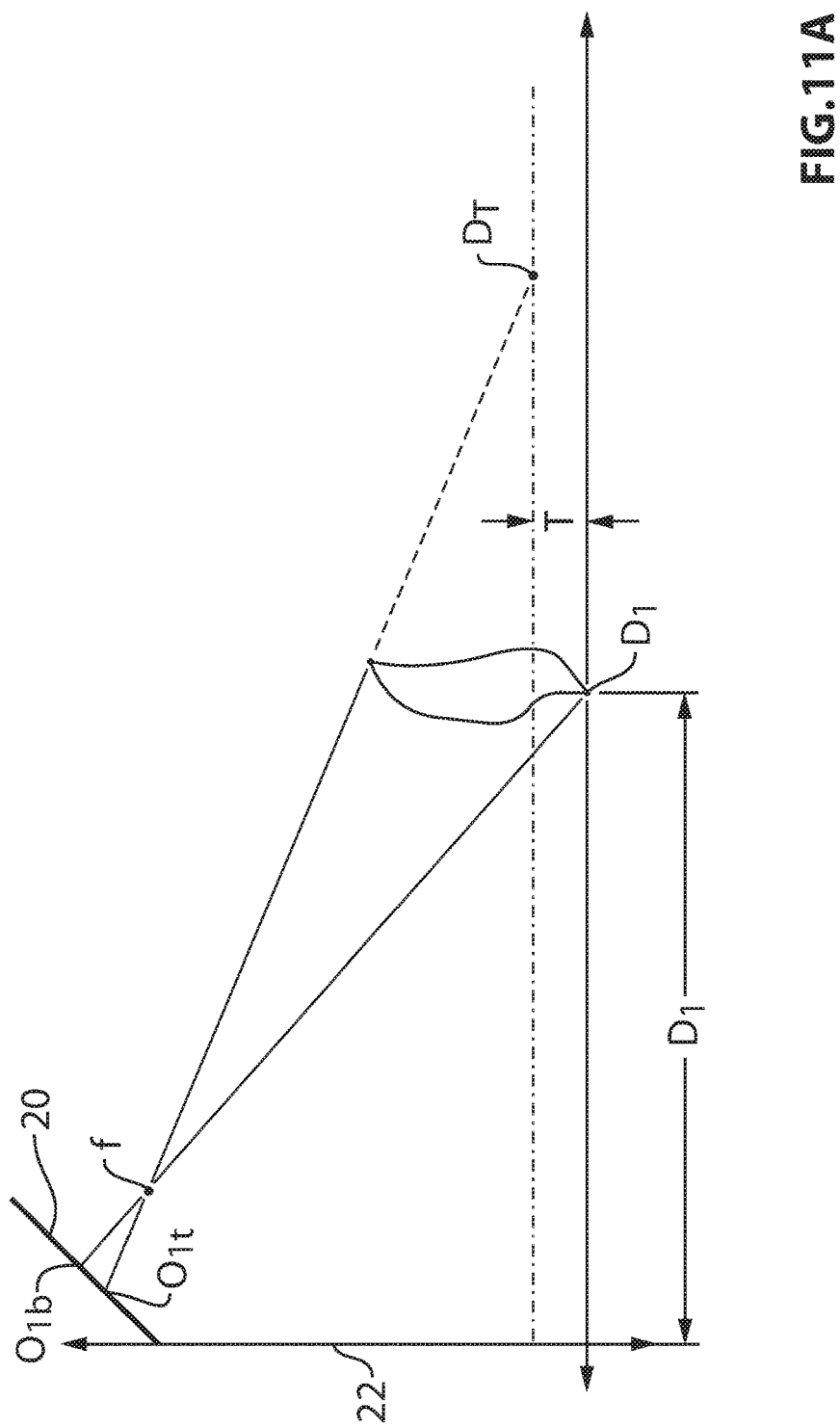
FIGS. 11A-11C are schematic diagrams illustrating the operation of an object height detection filter employed by the object detection algorithm.

The steps involved in this detection are as follows:

(1) Estimate the initial distance of the object from the reference camera using the pixel location of the bottommost point, $O_{1b}$, and use it with the Homography matrix to estimate the real-world coordinate, $D_1$, in the ground plane. See, for example, FIG. 11A.

Figure 11B:
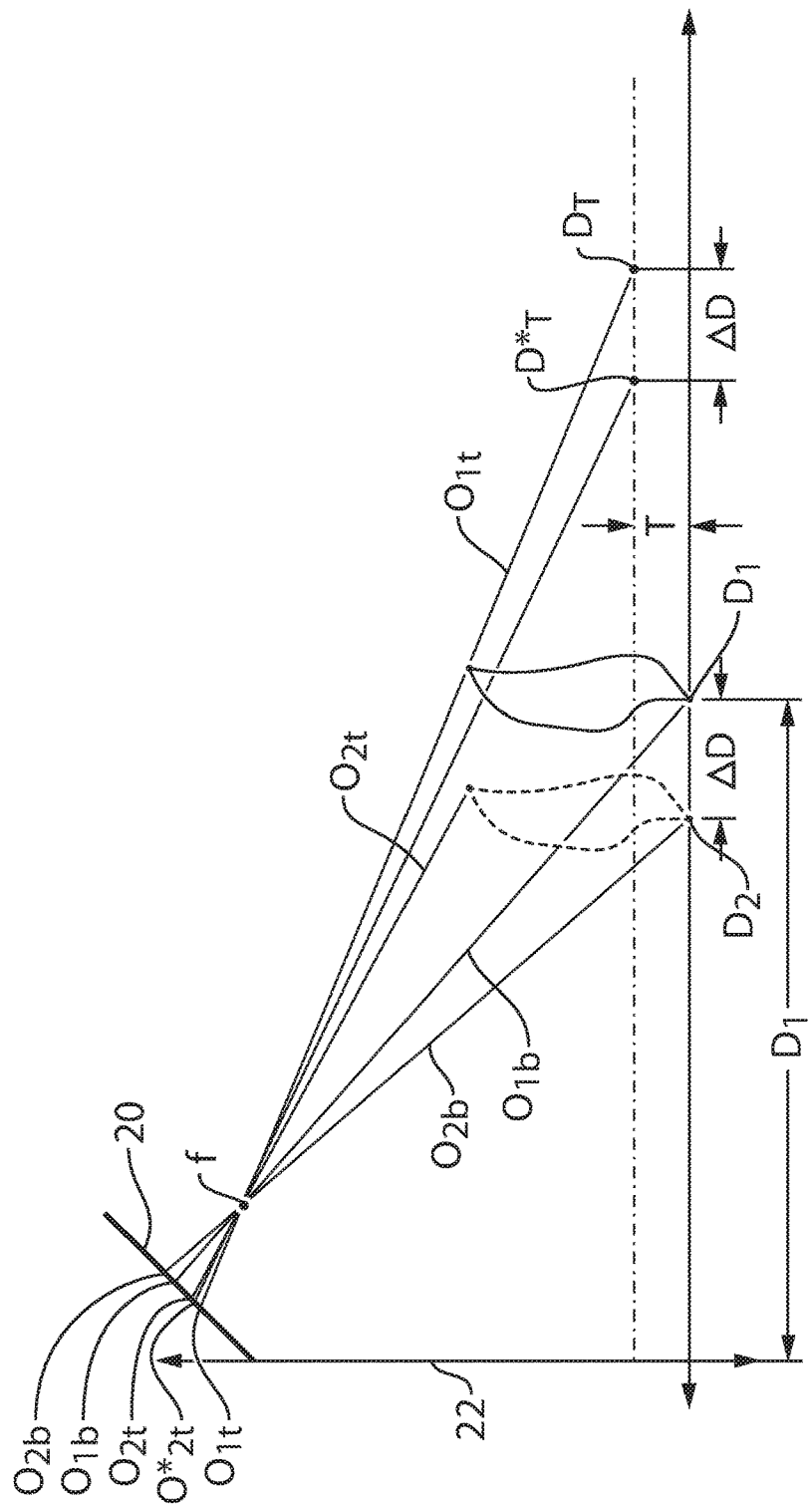

(2) Track the motion of the bottommost point the object from pixel location $O_{1b}$ to pixel location $O_{2b}$ and using the Homography equation estimate the real-world coordinate $D_2$ of the bottommost point on the ground plane, and the distance ΔD the bottommost point has moved. See, for example, FIG. 11B.

(3) Use the Homography equation to estimate a real world coordinate of the topmost point of the object corresponding to its location $O_{1t}$ in the first frame. Assume that the top of the object is at a height T, which will correspond to a point $D_T$ at this height. See FIG. 11A.

(4) Since the top and the bottom points of the physical object move by the same distance in the real world, then presuming that the topmost point of the object it is at height T, the new real world location of the top-most point, $D^*_T$, is $D_T+\Delta D$. See FIG. 11B.

(5) Using the inverse of the Homography equation, compute the pixel coordinate $O^*_{2T}$ of the top-most point after accounting for its real world displacement if it was at a height T. See FIG. 11B.

(6) Compare the pixel displacement of the estimated pixel location of the top most point with respect to the initial location, $\|O^*_{2t}-O_{1t}\|$, with that of actual pixel location of the tracked topmost point of the object with respect to the initial location $\|O_{2t}-O_{1t}\|$. If $\|O^*_{2t}-O_{1t}\|<\|(O_{2t}-O_{1t}\|$, then the topmost point of the object is above the height threshold and if $\|O^*_{2t}-O_{1t}\|>\|(O_{2t}-O_{1t}\|$, then the topmost point of the object is below the height threshold. See, for example, FIG. 10B where the object is higher than the threshold height T and so $O^*_{2t}$ is closer to $O_{1t}$ than $O_{2t}$.

Figure 11C:
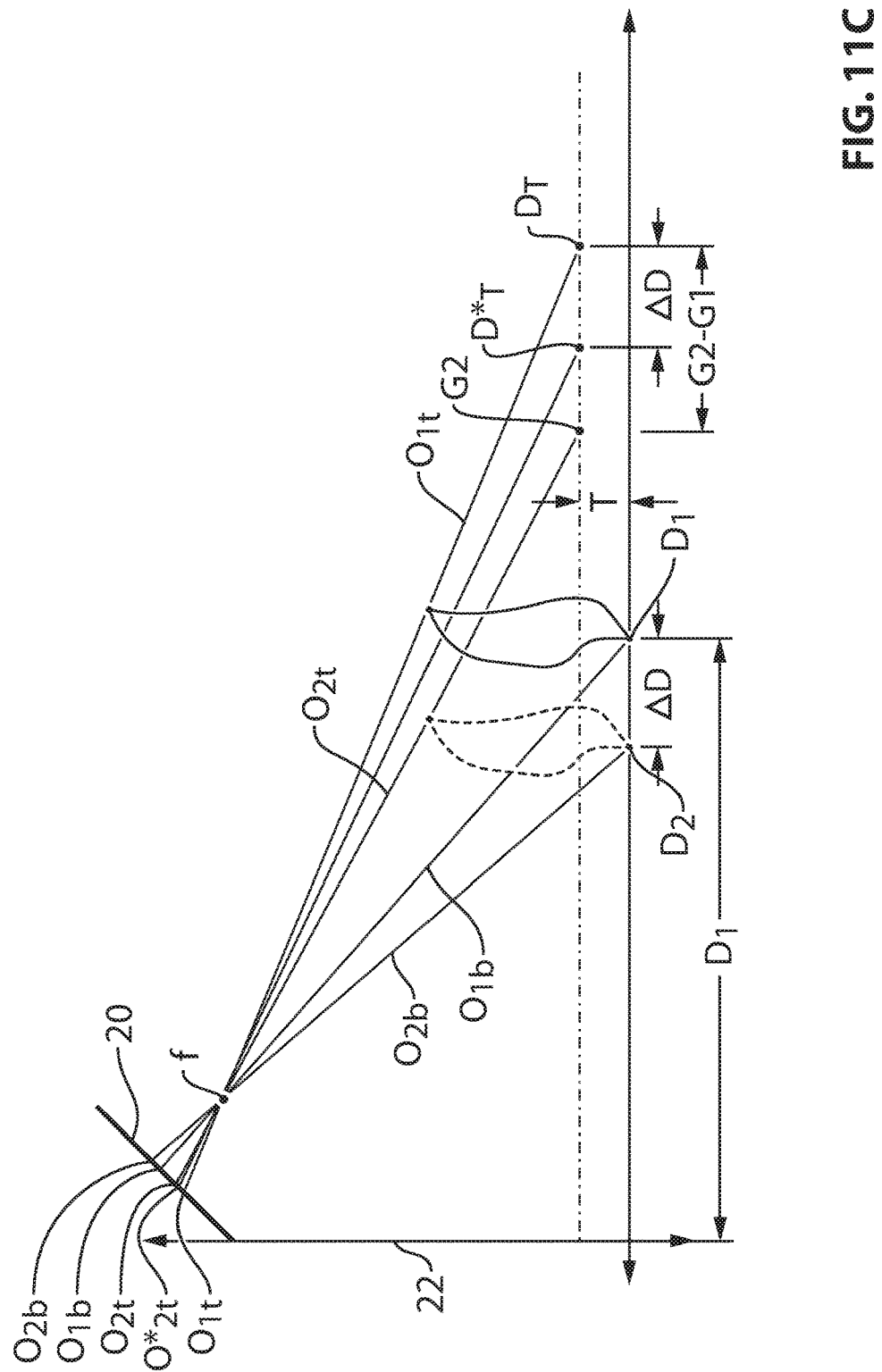

The foregoing steps utilized the image plane. It should also be appreciated that the analysis can just as well be carried out in real physical space. In this methodology, as exemplified in FIG. 11C, the rays in the first and second image frames corresponding to the topmost point of the object are projected onto the selected horizontal physical plane corresponding to height T to generate real points G1 and G2. The object is deemed to be a valid object, i.e., having a height greater than T, if $\|G2-G1\|>\Delta D$.

It will also be understood that in the case of T=0 the selected horizontal physical plane corresponds to the ground plane.

Referring back to FIG. 3, the output of the segmentation module 110—postulated objects—is fed in to a hypothesis evaluation stage 118. This stage evaluates the postulated objects and multiple hypotheses which could belong to the same object are combined to form a single hypothesis or postulated object.

Stage 122—temporal hypotheses assignment—tracks postulated objects over time. The postulated objects from stage 118 are further evaluated using the predicted hypotheses from the previous image frame. The corresponding hypotheses are assigned to the current frame where a match is found. However, if no match is found between the predicted hypothesis and the current estimated hypothesis, then a new hypothesis is instantiated.

In addition, if a hypothesis existed in the previous frame but is not currently detected, then this hypothesis is not immediately rejected, but is held in memory for a specified number of frames to verify that the postulated object is no longer present. In case where the postulated object is actually present, the detection may be missed intermittently, and therefore this temporal processing leads to a significant reduction in the false negatives.

Stage 126 is a distance and trajectory estimation block. Before the physical distance of the pixel locations can be estimated at step 128, the fish-eye distortion of the lens needs to be corrected. See FIG. 12. For this correction, the lens distortion is modeled as a fifth order polynomial and using this polynomial, each point in the captured image which needs further processing is de-warped.

The de-warped points used for estimating the distance of postulated objects are preferably the bottommost points of the objects which are assumed to lie on the ground plane. These points can be used to estimate the distance of the objects from the camera and this distance can then be translated to the vehicle coordinates. This allows the further processing of relevant postulated objects based on their relative distance to the vehicle.

The distance estimation of the same postulated object across multiple frames is subject to small variations owing to real world, non-ideal conditions. Thus, these estimated distances are filtered using a Kalman filter which can smooth out instantaneous variations. The same filter can also be used to predict the location of the object in the next frame and thus help predict the trajectory of the object, which is computed at step 132 (FIG. 3).

Owing to the nature of the problem, a modified Kalman filter is preferably used, which has the following order of steps:

Update Step: Update the filter parameters and estimate the filtered distance of the object detected in the current frame $(\hat{X},\hat{Y})$, using the input real world distance (X,Y). (See FIG. 12.)

Prediction Step: Predict the distance of the object in the next frame.

Stage 136 provides a hypothesis prediction. Based on the predicted physical location of the object, the location of each hypothesis in the next frame is estimated by projecting the distances back to the image plane. These projected pixel locations can then be used for the temporal assignation of the hypotheses in the next frame.

The system output is provided at stage 106. Based on the trajectory estimation of each object, if the detected object is in the path of the vehicle, or poses a threat to the vehicle, then the object is output using its centroid as well as its bounding region or contour. This output may be displayed visually on a display screen or the like mounted in the vehicle and may be accompanied by audible warnings such as an alarm or voice, or by tactile feedback such as a buzz in the steering wheel. In addition, in the event the system detects an imminent crash by virtue of an obstacle being immediately in the path of the vehicle various pre-emptive actions may be taken such as automated braking or tensioning of seat belts.

Those skilled in the art will appreciate that a variety of modifications may be made to the embodiments described herein without departing from the spirit of the invention.

The invention claimed is:

1. An obstacle detection method, comprising:
(a) disposing a camera at a vehicle, the camera having a field of view external of the vehicle;
(b) acquiring a series of image frames captured by the camera whilst the vehicle is in motion, the image frames defining an image plane having a vertical aspect and a horizontal aspect;
(c) detecting, via processing of captured image frames by a processor, a first object present in the series of image frames by edge detection;
(d) detecting, via processing of captured image frames by the processor, a second object present in the series of image frames by edge detection;
(e) for the first detected object,
(i) selecting, via a control that comprises the processor, and responsive to processing of captured image frames by the processor, first and second feature points from the first detected object that are spaced apart in a first image frame,
(ii) tracking, via processing of captured image frames by the processor, positions of the first and second feature points over at least a second image frame, and
(iii) determining, via processing of captured image frames by the processor, movement of the first and second feature points when projected to the image plane;
(f) for the second detected object,
(i) selecting, via the control, and responsive to processing of captured image frames by the processor, third and fourth feature points from the second detected object that are spaced apart in a first image frame,
(ii) tracking, via processing of captured image frames by the processor, positions of the third and fourth feature points over at least a second image frame, and
(iii) determining, via processing of captured image frames by the processor, movement of the third and fourth feature points when projected to the image plane;
(g) comparing, via the control, the movement of the first and second feature points when projected to the image plane to the movement of the third and fourth feature points when projected to the image plane;
(h) distinguishing, via the control, between the first detected object being a three dimensional object and the second detected object being a two dimensional object by determining, via the control, that the movement of the first feature point when projected to the image plane is dissimilar to that of the second feature point and by determining, via the control, that the movement of the third feature point when projected to the image plane is similar to that of the fourth feature point; and
(i) making, via the control, and responsive to processing of captured image frames by the processor, a trajectory estimation of the first detected object and, based on the trajectory estimation, determining, via the control, whether the first detected object is in a path of movement of the vehicle.

2. The method according to claim 1, wherein the second detected object comprises a shadow.

3. The method according to claim 1, wherein the second detected object comprises a pavement marking.

4. The method according to claim 1, wherein the second detected object comprises a ground marking.

5. The method according to claim 1, including unwarping a given pixel position to account for lens distortion prior to determining a physical location corresponding to the given pixel position.

6. The method according to claim 1, wherein the first and second feature points are portions of top and bottom edge contours of the first detected object.

7. The method according to claim 1, wherein the first and second feature points selected from the first detected object are spaced vertically apart in the first image frame.

8. The method according to claim 1, comprising:
estimating, via the control, from the first image frame, a physical distance $D_1$ of the first feature point $O_{1b}$ to the camera in a selected physical horizontal plane;
estimating, via the control, from the first image frame, a physical location $D_T$ of the second feature point $O_{1T}$ assuming that the second feature point physically lies at a height T above the selected physical horizontal plane; and
estimating, via the control, from the second image frame, a physical distance $D_2$ of the first feature point $O_{2b}$ to the camera in the selected physical horizontal plane, and determining the distance $\Delta D$ between $D_2$ and $D_1$.

9. The method according to claim 8, wherein the selected physical horizontal plane is the ground plane.

10. The method according to claim 1, comprising providing extrinsic parameters of the camera, the extrinsic parameters comprising a height of the camera at the vehicle.

11. The method according to claim 10, comprising providing extrinsic parameters of the camera, the extrinsic parameters comprising angular orientation of the camera at the vehicle.

12. The method according to claim 10, comprising providing intrinsic parameters of the camera, the intrinsic parameters comprising focal length of a lens of the camera.

13. The method according to claim 10, comprising providing vehicle data of the vehicle the camera is disposed at, the vehicle data comprising speed and steering angle.

14. The method according to claim 13, wherein the vehicle data is provided via a controller area network.

15. The method according to claim 1, comprising operating in conjunction with a dynamic calibration system that is operable to dynamically ascertain rotational angles of the camera so that any deviations over time from nominal angle are accounted for.

16. An obstacle detection method, comprising:
(a) disposing a camera at a vehicle, the camera having a field of view external of the vehicle;
(b) acquiring a series of image frames captured by the camera whilst the vehicle is in motion, the image frames defining an image plane having a vertical aspect and a horizontal aspect;
(c) detecting, via processing of captured image frames by a processor, a first object present in the series of image frames by edge detection;
(d) detecting, via processing of captured image frames by the processor, a second object present in the series of image frames by edge detection;
(e) for the first detected object,
(i) selecting, via a control that comprises the processor, and responsive to processing of captured image frames by the processor, first and second feature points from the first detected object that are spaced apart in a first image frame,
(ii) tracking, via processing of captured image frames by the processor, positions of the first and second feature points over at least a second image frame, and
(iii) determining, via processing of captured image frames by the processor, movement of the first and second feature points when projected to the image plane;
(f) for the second detected object,
(i) selecting, via the control, and responsive to processing of captured image frames by the processor, third and fourth feature points from the second detected object that are spaced apart in a first image frame,
(ii) tracking, via processing of captured image frames by the processor, positions of the third and fourth feature points over at least a second image frame, and (iii) determining, via processing of captured image frames by the processor, movement of the third and fourth feature points when projected to the image plane;

(g) comparing, via the control, the movement of the first and second feature points when projected to the image plane to the movement of the third and fourth feature points when projected to the image plane;

(h) distinguishing, via the control, between the first detected object being a three dimensional object and the second detected object being a two dimensional object by determining, via the control, that the movement of the first feature point when projected to the image plane is dissimilar to that of the second feature point and by determining, via the control, that the movement of the third feature point when projected to the image plane is similar to that of the fourth feature point;

(i) providing a height of the camera at the vehicle;

(j) providing angular orientation of the camera at the vehicle;

(k) providing a focal length of a lens of the camera;

(l) providing vehicle data of the vehicle the camera is disposed at, the vehicle data comprising speed and steering angle; and (m) making, via the control, and responsive to processing of captured image frames by the processor, a trajectory estimation of the first detected object and, based on the trajectory estimation, determining, via the control, whether the first detected object is in a path of movement of the vehicle.

17. The method according to claim 16, wherein the second detected object comprises a shadow.

18. The method according to claim 16, wherein the second detected object comprises a ground marking.

19. The method according to claim 16, comprising operating in conjunction with a dynamic calibration system that is operable to dynamically ascertain rotational angles of the camera so that any deviations over time from nominal angle are accounted for.

20. An obstacle detection method, comprising:

(a) disposing a camera at a vehicle, the camera having a field of view external of the vehicle;

(b) acquiring a series of image frames captured by the camera whilst the vehicle is in motion, the image frames defining an image plane having a vertical aspect and a horizontal aspect;

(c) detecting, via processing of captured image frames by a processor, a first object present in the series of image frames by edge detection;

(d) detecting, via processing of captured image frames by the processor, a second object present in the series of image frames by edge detection;

(e) for the first detected object, (i) selecting, via a control that comprises the processor, and responsive to processing of captured image frames by the processor, first and second feature points from the first detected object that are spaced apart in a first image frame, (ii) tracking, via processing of captured image frames by the processor, positions of the first and second feature points over at least a second image frame, and (iii) determining, via processing of captured image frames by the processor, movement of the first and second feature points when projected to the image plane;

(f) for the second detected object, (i) selecting, via the control, and responsive to processing of captured image frames by the processor, third and fourth feature points from the second detected object that are spaced apart in a first image frame, (ii) tracking, via processing of captured image frames by the processor, positions of the third and fourth feature points over at least a second image frame, and (iii) determining, via processing of captured image frames by the processor, movement of the third and fourth feature points when projected to the image plane;

(g) comparing, via the control, the movement of the first and second feature points when projected to the image plane to the movement of the third and fourth feature points when projected to the image plane;

(h) distinguishing, via the control, between the first detected object being a three dimensional object and the second detected object being a two dimensional object by determining, via the control, that the movement of the first feature point when projected to the image plane is dissimilar to that of the second feature point and by determining, via the control, that the movement of the third feature point when projected to the image plane is similar to that of the fourth feature point;

(i) operating in conjunction with a dynamic calibration system that is operable to dynamically ascertain rotational angles of the camera so that any deviations over time from nominal angle are accounted for; and (j) making, via the control, and responsive to processing of captured image frames by the processor, a trajectory estimation of the first detected object and, based on the trajectory estimation, determining, via the control, whether the first detected object is in a path of movement of the vehicle.

21. The method according to claim 20, comprising providing extrinsic parameters of the camera, the extrinsic parameters comprising a height and angular orientation of the camera at the vehicle, and comprising providing intrinsic parameters of the camera, the intrinsic parameters comprising focal length of a lens of the camera, and comprising providing vehicle data of the vehicle the camera is disposed at, the vehicle data comprising speed and steering angle.

22. The method according to claim 21, wherein the vehicle data is provided via a controller area network.

23. The method according to claim 22, wherein the second detected object comprises a shadow.

\* \* \* \* \*

UNITED STATES PATENT AND TRADEMARK OFFICE
CERTIFICATE OF CORRECTION

PATENT NO. : 10,043,082 B2
APPLICATION NO. : 15/406860
DATED : August 7, 2018
INVENTOR(S) : Nikhil Gupta Page 1 of 1

It is certified that error appears in the above-identified patent and that said Letters Patent is hereby corrected as shown below:

In the Specification

Column 2
Line 38, "positions G1', G'." should be --positions G1', G2'.--

Signed and Sealed this
Sixth Day of November, 2018

Andrei Iancu
*Director of the United States Patent and Trademark Office*